F. MERTZ.
WINDSHIELD WIPER.
APPLICATION FILED JULY 12, 1920.
1,403,703.
Patented Jan. 17, 1922.
3 SHEETS—SHEET 1.
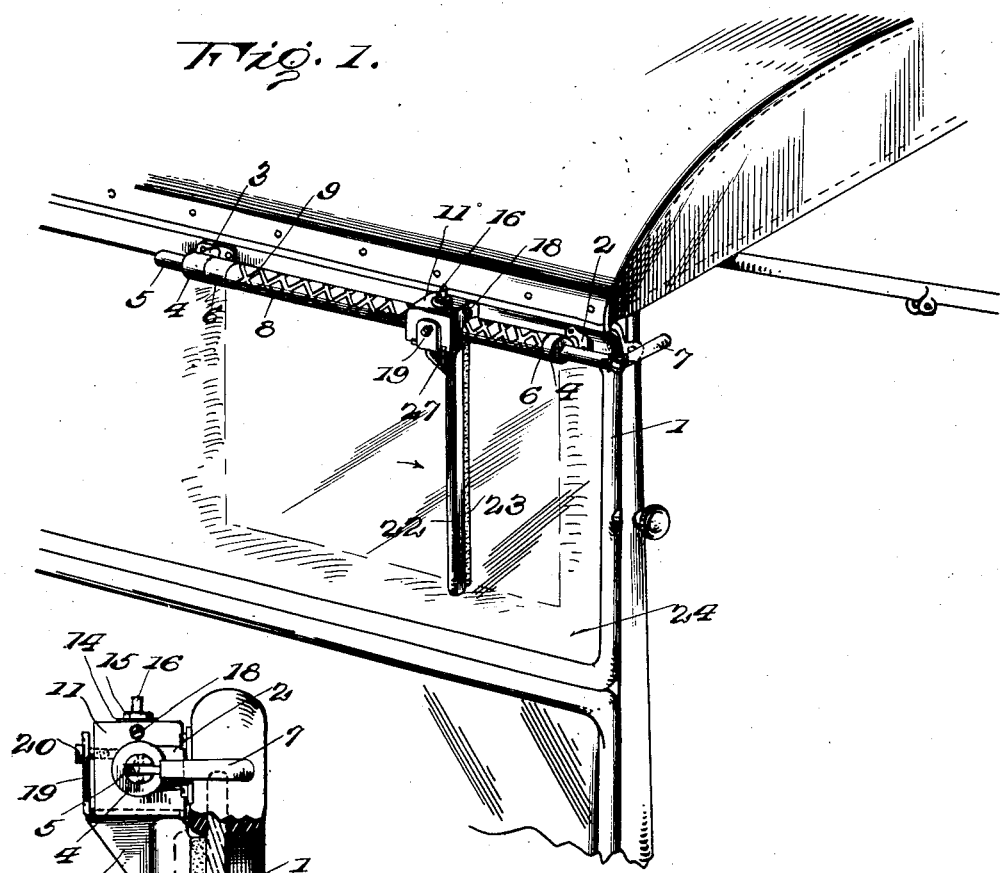
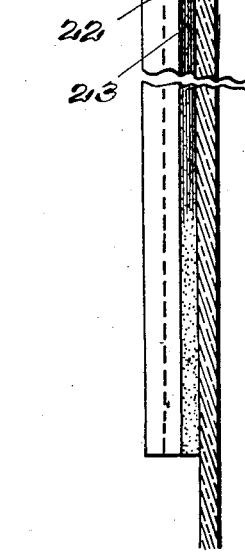
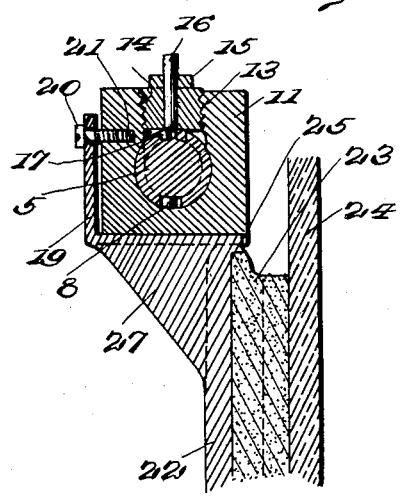
Inventor
Frank Mertz.
By Lacey & Lacey, Attorneys

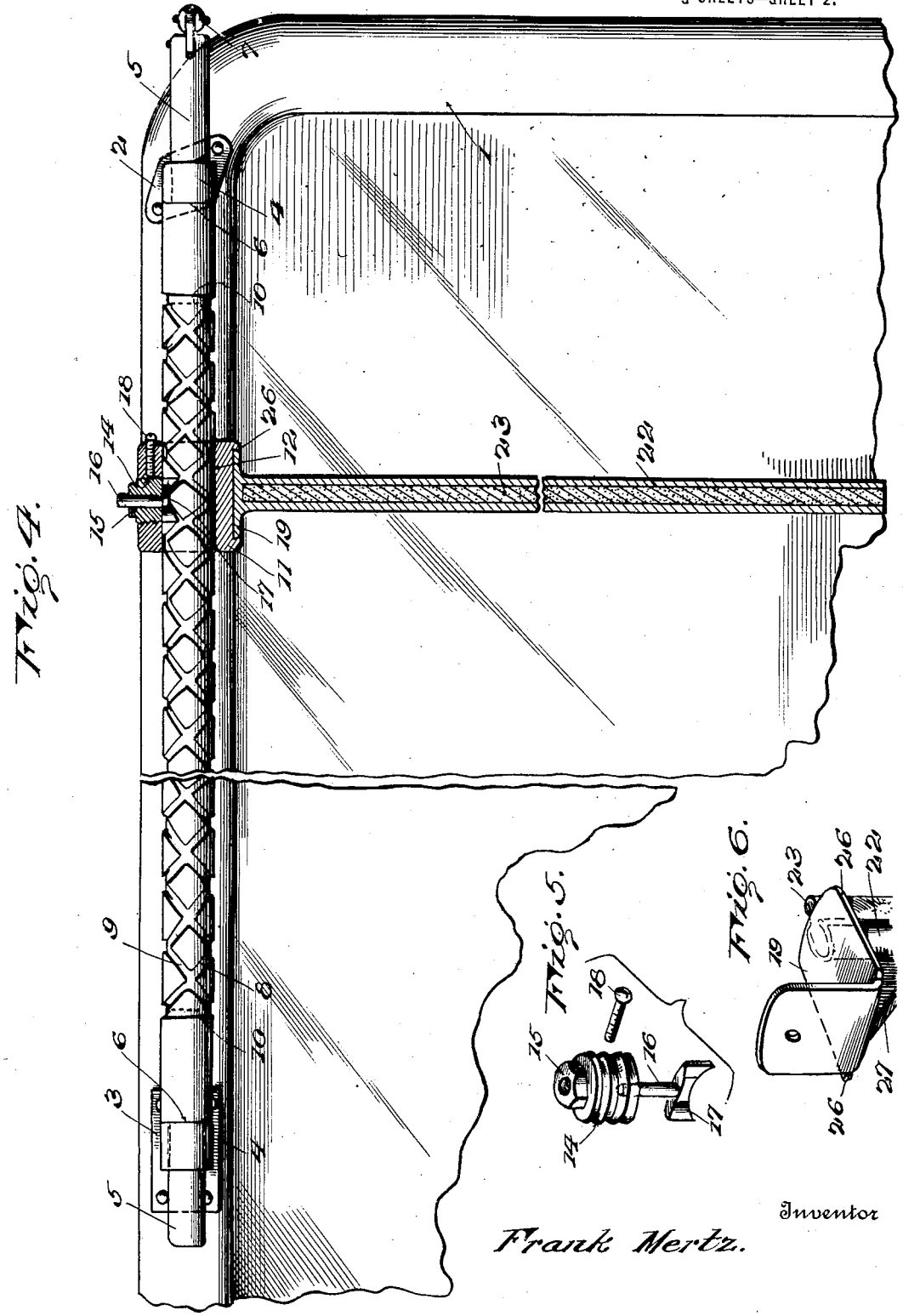

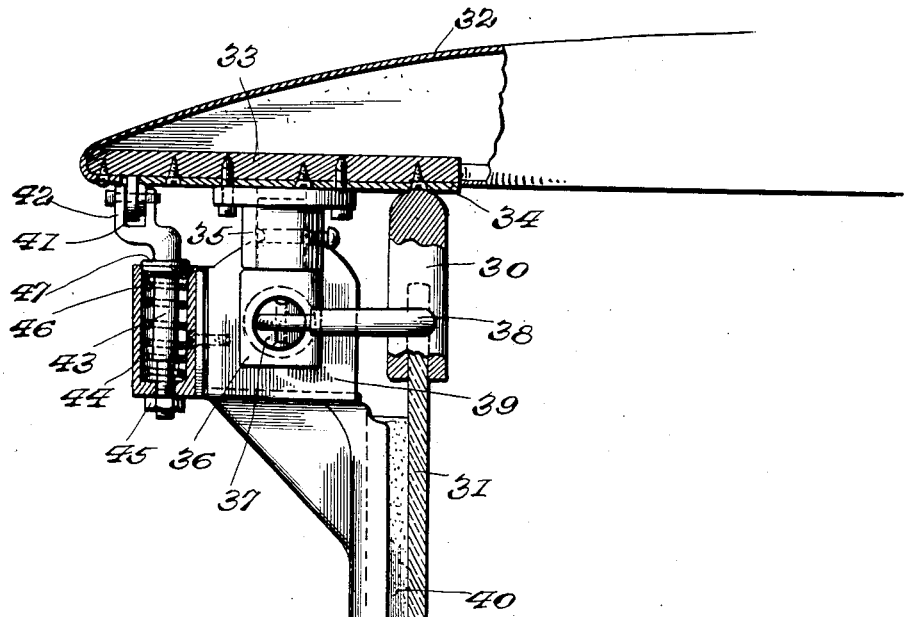
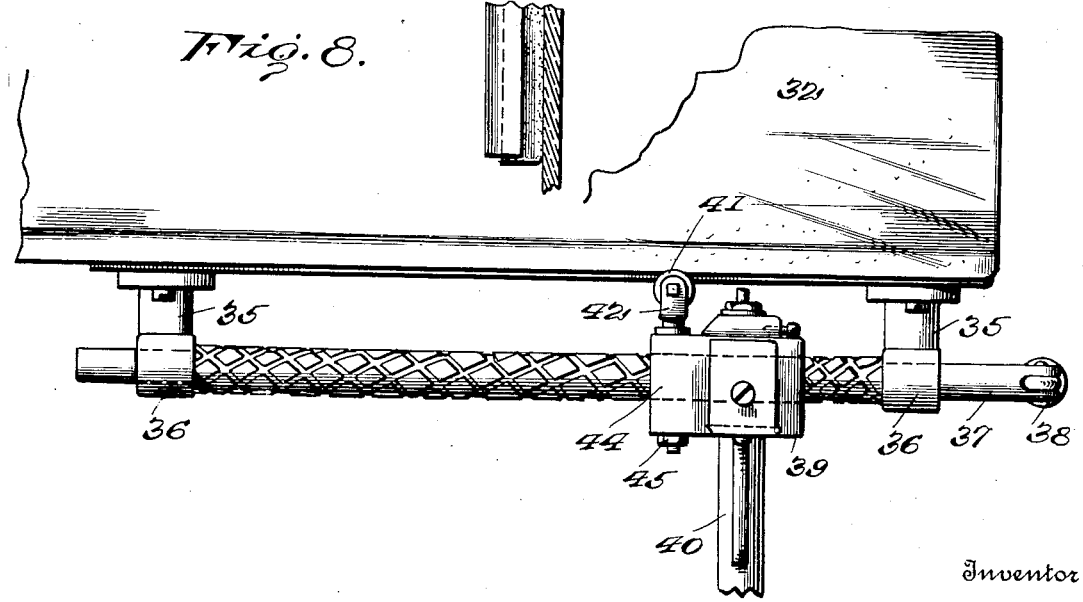

UNITED STATES PATENT OFFICE.

FRANK MERTZ, OF JOHNSTOWN, PENNSYLVANIA, ASSIGNOR OF ONE-HALF TO CLOYD S. MISHLER, OF JOHNSTOWN, PENNSYLVANIA.

WINDSHIELD WIPER.

1,403,703.  Specification of Letters Patent.  Patented Jan. 17, 1922.

Application filed July 12, 1920. Serial No. 395,577.

*To all whom it may concern:*

Be it known that I, FRANK MERTZ, a citizen of the United States, residing at Johnstown, in the county of Cambria and State of Pennsylvania, have invented certain new and useful Improvements in Windshield Wipers, of which the following is a specification.

It is well known that the glass wind shields of automobiles become coated with moisture in inclement weather so that the vision is obscured and the chauffeur is frequently unable to observe objects or persons in the path of the vehicle so that disastrous accidents have occurred through collision with such objects or persons. It is the object of my invention to provide means whereby the moisture may be readily removed from the wind shield without requiring stoppage of the vehicle and without imposing any serious manual strain upon the chauffeur. It is also an object of the invention to provide means for accomplishing the stated result which will not detract from the appearance of the vehicle and which will not in themselves obscure the vision of the chauffeur and thus defeat the principal object sought. It is also an object of the invention to provide means which will be inexpensive and efficient and which will operate upon the entire wind shield if so desired without requiring any particular adjustment by the chauffeur or other occupant of the vehicle.

The several stated objects of the invention and such other objects as will hereinafter incidentally appear are attained in such a mechanism as is illustrated in the accompanying drawings and the invention resides in certain novel features which will be particularly pointed out in the claims following the detailed description.

In the drawings—

Figure 1 is a perspective view of my improved wiper applied to a wind shield;

Fig. 2 is an enlarged view partly in end elevation and partly in section;

Fig. 3 is an enlarged detail transverse section of a portion of the wiper;

Fig. 4 is a front elevation, with parts in section, of the wiper in its operative position;

Figs. 5 and 6 are detailed views of portions of the wiper carrier;

Fig. 7 is an end view, partly in section, of another embodiment of the invention;

Fig. 8 is a front elevation of the form shown in Fig. 7.

In carrying out my invention, I secure upon the frame 1 of the wind shield bearing brackets 2 and 3 each of which consists of a base plate of such dimensions and shape that it may be readily placed upon the front side of the upper bar of the wind shield frame and secured thereto by screws, rivets, or similar fasteners. Upon the front side of the base plate is a sleeve, indicated at 4, through which the wiper shaft 5 extends and in which said shaft is rotatably mounted. The shaft 5 is reduced at its ends so that it may be readily fitted through the sleeves 4 and annular shoulders 6 are thereby formed on the shaft which abut the said bearing sleeves and thereby prevent endwise movement of the shaft. At the outer end of the shaft, I have illustrated a crank arm 7 whereby the chauffeur may rotate the shaft as needed but it is obvious that the shaft may be connected by a flexible transmitting shaft to an axle of the vehicle so that it will be automatically rotated during the travel of the vehicle. The major portion of the wiper shaft is provided with spiral grooves 8 and 9 oppositely disposed upon the shaft and connected at their ends by straight branches 10. Slidably fitted upon the shaft between the bearing sleeves 4 is a carrier 11 which may be a block of angular configuration having a cylindrical horizontal bore 12 therethrough to receive the shaft as will be readily understood. In the upper side of this carrier 11 is formed an opening 13 which receives a threaded sleeve or bearing nut 14 having an angular boss 15 upon its upper end to be engaged by a turning tool. This bearing or nut 14 has a center opening therethrough to receive a pin 16 rising from a slide 17 which fits within the groove 8 or 9 as the case may be and is slidable therein so that as the shaft is rotated the slide 17 will be caused to travel longitudinally of the shaft. A set screw 18 may be mounted in one end of the carrier 11, if desired, to bear upon the nut 14 and thereby lock the same in its adjusted position when the parts are assembled for use. Disposed against the bottom and front sides of the carrier 11 is a right angular bracket 19 which is secured to the carried by a set screw or its equivalent 20 inserted through the front upstanding arm of the bracket and engaging in a socket 21 in the carrier, as clearly shown in Fig. 3. From the inner or rear edge of the bottom member of this bracket, a wiper arm 22 depends and this arm has a dovetailed groove or recess extending from end to end of its rear side to receive a wiper pad 23 which may be of felt or other suitable material and of such dimensions that it will close the space between the wiper arm and the glass 24 of the wind shield and bear upon the surface of the glass, as clearly shown in Fig. 3.

The construction and arrangement of the several parts of the mechanism having been thus set forth, it is thought the operation and advantages of the same will be readily understood and appreciated. The slide 17 is obviously swiveled in the nut 14 and any movement of the slide longitudinally of the wiper shaft will be communicated directly to the said nut and through the same to the carrier 11 so that the wiper arm suspended on the carrier will be caused to move over the surface of the wind shield. As the shaft is rotated, the wall of the spiral groove in which the slide 17 is engaged will bear upon the slide and force the same to travel toward one end of the shaft. When the slide reaches the end of the said spiral groove it will enter the connecting annular straight branch 10 and will then remain relatively stationary until the oppositely disposed spiral groove engages it whereupon it will be driven in the opposite direction and returned to its former position unless the rotation of the wiper shaft should, in the meanwhile, be arrested. The wiper pad is, of course, in intimate contact with the front surface of the wind shield glass and as it will follow the movement of the carrier it will be reciprocated across said surface and wipe all moisture therefrom so that, even in the most inclement weather, the wind shield will be clear and an unobstructed view of the path of the vehicle will be had. It is, of course, desirable that the wiper arm be held against movement relative to the carrier and to this end I supplement the holding screw 20 by providing a dovetailed groove 25 in the under side of the carrier and beveling the edges of the lower member of the bracket 19 to engage said groove, as shown at 26 in Fig. 4. The wiper arm 22 is preferably integral with the rear end of the bracket and a bracing web 27 is provided between the bracket and the upper end of said arm, as clearly shown.

In some types of automobiles it is more convenient to mount the wind shield wiper upon the top of the vehicle than upon the frame of the wind shield and in Figs. 7 and 8 I have shown the wiper mounted upon the top of a motor vehicle. In these figures, 30 designates the wind shield frame and 31 the glass of the same, while 32 designates the vehicle top. The frame of the top comprises a wooden bar or plate 33 to the under side of which a metallic plate 34 is secured in order to lend additional strength to the structure. The bearing brackets 35 are secured to the bar 33 and depend therefrom and the bearings 36 for the wiper shaft are swiveled in the depending tubular portions of these brackets as will be readily understood on reference to Fig. 7, the swivel mounting of the bearings permitting them to yield somewhat to vibrations of the vehicle. The wiper shaft 37 is of the same construction as the wiper shaft 5 shown in the first described form of the invention and is illustrated as provided with a crank handle 38 at one end, although it is to be understood that the shaft may be driven by a flexible connection with the front axle of the vehicle. The carrier 39 corresponds in all respects to the carrier 11 and the wiper 40 is mounted on the carrier in the same manner that the wiper 23 is mounted upon the carrier 11. In addition to disposing the bearings for the wiper shaft vertically and securing them to the frame of the vehicle top, in this embodiment of the invention I illustrate a tension roller which is adapted to travel upon the frame bar 33 and hold the wiper to the wind shield. This tension roller 41 is mounted in the forked upper end 42 of a stem 43 which is fitted in a tubular offset 44 of the carrier 39. The stem 43 is extended through the bottom of the tubular offset 44 and is equipped with a nut 45 whereby it is prevented from being expelled through the top of the offset or sleeve 44. A spring 46 is coiled around the stem 43 between the bottom of the sleeve 44 and an abutment 47 on the stem so that the expansion of the spring holds the roller 41 against the bar 33 and also resists any tendency of the wiper to swing outwardly from the wind shield. It may be found desirable at times to provide a tension roller in the form of the invention illustrated in Figs. 1 to 6 and herein first described, and to meet this requirement it is only necessary to provide the carrier 11 with a sleeve or tubular offset corresponding in all respects to the sleeve 44 but disposed horizontally at the end of the carrier instead of vertically so that the roller will run upon the frame of the wind shield instead of upon the frame of the vehicle top as will be obvious to those skilled in the art.

Having thus described the invention, what is claimed as new is:

1. A wind shield wiper comprising a carrier mounted in front of the wind shield, a rigid bracket connected with the bottom and front sides of the carrier, the upper front extremity of the bracket being below a horizontal plane resting on the top of the carrier, a wiper arm rigid with the bracket immediately adjacent the carrier and depending from the bracket, a wiper pad on the rear side of the wiper arm and extending from end to end thereof, and means for causing travel of the carrier upon the wind shield.

2. A wind-shield wiper comprising a carrier provided in its bottom with a dovetailed groove, a bracket having a member engaging said groove and a member rising in front of the carrier, an adjustable connection between the last-mentioned member and the carrier, a wiper pad carried by and depending from said bracket, and means for supporting and effecting travel of the carrier.

3. A wind shield wiper comprising a carrier, a wiper pad depending from the carrier, means for supporting and effecting travel of the carrier, and a tension device mounted directly on the carrier and bearing constantly against a fixed support to hold the wiper pad to its work, the entire carrier, bracket, and tension device being disposed in front of the wind shield.

4. A wind shield wiper comprising a carrier mounted in front of the wind shield, a wiper pad depending from the carrier, means for effecting travel of the carrier, a tubular offset on the carrier, a stem mounted slidably in the offset, a spring coiled around the stem between an abutment thereon and the bottom of the offset, means to retain the stem in the offset, and a roller in the outer end of the stem traveling on a member which is fixed relative to the carrier.

FRANK MERTZ.